Sept. 27, 1938.    G. W. MOORE    2,131,329
LIQUID FEED CONTROL DEVICE
Filed May 26, 1936
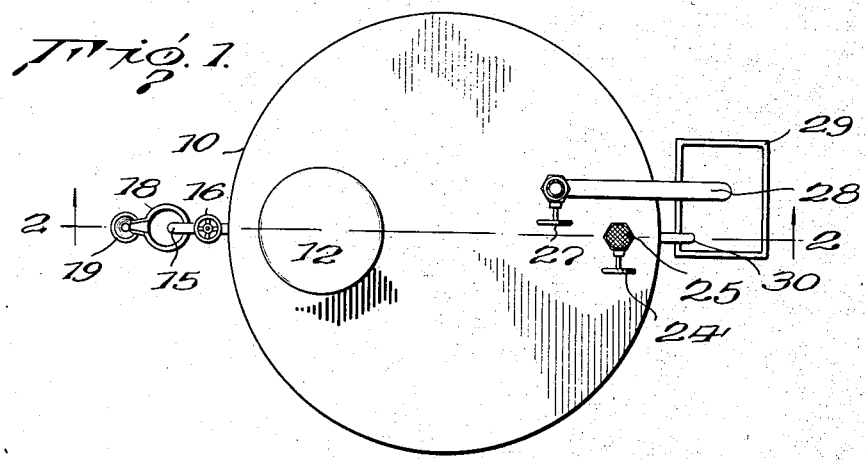
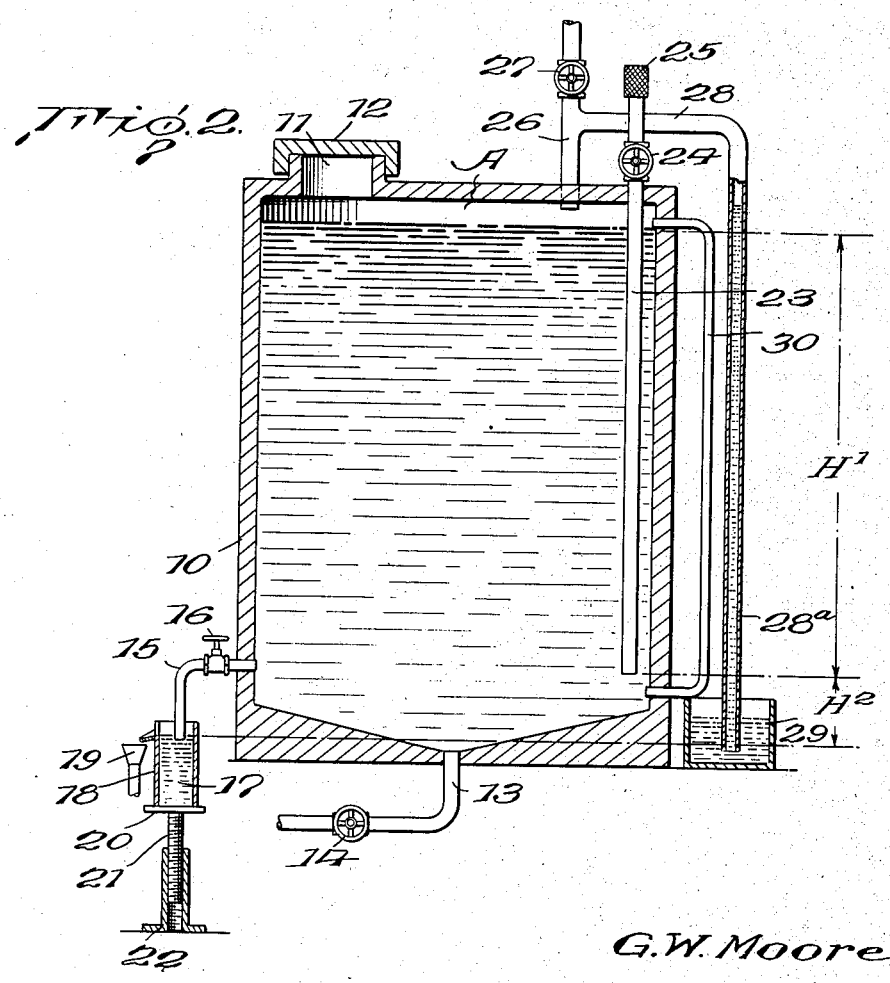
Inventor
G. W. Moore,
By Church & Church
His Attorneys Patented Sept. 27, 1938

2,131,329

UNITED STATES PATENT OFFICE 2,131,329

LIQUID FEED CONTROL DEVICE

George W. Moore, Broomall, Pa.

Application May 26, 1936, Serial No. 81,965

3 Claims. (Cl. 210—29)

This invention relates to improvements in liquid feed control devices.

One object of the invention is to provide a liquid feed control device of comparatively simple construction, which is capable of adjustment to feed the liquid at a desired rate, the adjustments being such that the variations in the rate of feed are very minute dependent upon the will of the operator.

More especially, the invention contemplates liquid feed equipment designed primarily for use in feeding chemicals to water supply and sewage when treatment of the same is necessary, although the present apparatus can be used in industrial plants where control of solution feed is desired for any reason, or other places where it is desired to control the flow of solutions or chemicals.

Briefly, the invention contemplates an apparatus wherein the liquid is stored in a reservoir, so to speak, with pressure conditions within the reservoir such that equilibrium in the liquid column of the reservoir would be maintained by atmospheric pressure but, by a controlled admission of air or other fluid to the reservoir, the equilibrium of the column of liquid will be disturbed and atmospheric pressure will cause a discharge of the liquid from the reservoir. The air or other fluid admitted for disturbing the equilibrium of the liquid column is supplied through an inlet pipe terminating within the reservoir at a point adjacent the lower end thereof, but spaced vertically from the effective point of discharge of the liquid discharge pipe, and the rate of flow may be varied either by varying the volume of air or operating fluid admitted or, if desired, by varying the vertical spacing of the inner end of the air inlet pipe and the effective point of discharge of the liquid discharge pipe.

With these and other objects in view, the invention consists in certain details of construction and combinations and arrangements of parts, all as will hereinafter be more fully described and the novel features thereof particularly pointed out in the appended claims.

In the accompanying drawing—

Figure 1 is a top plan view of one form of apparatus embodying the invention; and Fig. 2 is a vertical sectional view on the line 2—2 of Fig. 1.

In the apparatus illustrated, which is preferred in view of the fact that very good results have been obtained with such apparatus, the reservoir, indicated at 10, is provided at its upper end with a manhole 11 adapted to be sealed by a closure 12 and at its lower end said reservoir is provided with a clean-out pipe 13 having a valve 14 interposed therein. Adjacent the lower end of the reservoir, there is a discharge pipe 15 having a stop-cock or valve 16 interposed therein, the outer end portion of pipe 15 being offset downwardly and having its extremity submerged in a body of liquid 17 in a container 18, from which the liquid may flow into a conduit 19, by which it is conveyed to the point of use. Where this form of discharge is used, container 18 is preferably supported on a platform 20, vertically adjustable by means of a threaded stem 21 depending from said platform, screwed into a base 22. As will be apparent, the degree of submergence of discharge 15 may be varied by screwing the stem 21 into and out of the base 22. This arrangement of the discharge is preferred because the end of the discharge pipe being submerged, air cannot gain access to the interior of the reservoir through the discharge pipe. However, as indicated, this specific form of discharge means is not essential. Disposed vertically within the reservoir, and preferably projecting above the top of the latter, is a pipe 23, through which air or other operating fluid can be admitted to the reservoir. The inner end of pipe 23 terminates above the effective point of discharge of outlet pipe 15, the distance in the present instance being indicated at $H^2$, while the distance from the inner extremity of said pipe 23 to the top of the column of liquid in the reservoir is indicated at $H^1$. Flow of air or fluid through pipe 23 is controlled by valve 24 and, if desired, a filter 25 may also be provided on said pipe.

Also extending into the interior of the reservoir from the upper end thereof is a pipe 26 provided with a valve 27, through which the tank is exhausted when being filled. A branch 28 extending from pipe 26 and turned downwardly alongside of the reservoir as at 28ª with its lower end submerged in receptacle 29 forms a vacuum gauge. A solution or liquid level gauge, denoting the height of the column of liquid within the reservoir 10, is provided at 30.

With the reservoir filled and the device ready to operate, the summations of the pressure in the air space A within the reservoir above the solution, plus the vapor pressure, plus the pressure of the column of liquid measured from the surface to the effective point of discharge, of discharge pipe 15, equals atmospheric pressure for maintaining equilibrium of the column of liquid, so that there is no discharge. Also under these conditions, the pressure at the lower extremity of the air inlet pipe 23 equals the air space pressure within the reservoir, plus the vapor pressure, plus the pressure of the column $H^1$. When, however, the air inlet valve 24 is opened, the equilibrium of the column is disturbed and atmospheric pressure forces air into pipe 23 which, in turn, increases the pressure inside the pipe and causes air to flow out of the lower end of said pipe from which it escapes to the air space A, thus increasing the pressure at this point on the column of liquid, and causes the latter to be discharged. The rate at which air enters through the inlet valve depends upon two factors. First, the differential pressure between atmospheric pressure and the pressure inside of pipe 23, and, secondly, the size of the opening in valve 24. The pressure in pipe 23 at the inlet valve is directly proportionate to that at the lower end of pipe 23 and the pressure at said lower end, after any condition of flow has been established, is substantially constant, because as the height of the column denoted by $H^1$ decreases, the pressure in air space A has increased equal to a column of solution corresponding to the decrease in item $H^1$. In other words, as the solution is discharged, the summation of all pressure at the inner extremity of pipe 23, namely, the air space pressure, plus vapor pressure, plus solution pressure, is always equal.

The item $H^2$ or, the height of the column from the effective point of discharge of pipe 15 and the inner terminal of pipe 23 is the controlling factor in determining the differential of pressure between atmospheric pressure and the pressure inside the air inlet pipe 23. The amount of air entering the apparatus follows certain different laws and can be expressed as follows: $Q=CAV$, where "Q" is discharge in cubic feet per second; "C" is coefficient of flow; "A" area in square feet; and "V" velocity in feet per second. Each part of the formula is dependent upon certain factors. For instance "C" is a coefficient for roughness or loss of head, due to friction; "A" depends upon the amount of opening of air inlet valve 24; and "V" will depend not only on the differential in pressure but will also be influenced by the temperature of the air inside and out and whether the air entering is dry or moist. Therefore, it can be determined that for any given opening of the air inlet valve 24, the differential in pressure will depend on item $H^2$, and for any increase in $H^2$, there will be a proportionate increase in flow of air, because to increase the differential in pressure, in turn increases the velocity of flow and, thereby, the rate at which air enters. Likewise, by maintaining $H^2$ constant, the velocity at which air enters is constant, but the flow of air can be varied by varying the area of opening in the air inlet pipe. With a continuous flow of air in the air space A, thereby increasing the pressure of the air at that point, the equilibrium of the solution or liquid is constantly disturbed and effects a continuous discharge. As above indicated, the rate of discharge is proportionate to the amount of air entering, although the exact amount depends upon certain physical laws. For instance, the amount of pressure exerted by the air in the air space, together with the air supplied through pipe 23 will depend upon the temperature and density of the air, in that, if the temperature remains substantially constant, the discharge of solution or liquid will be constant, but if the air is losing heat units and, thereby, continually shrinking, the rate of discharge will be reduced. On the other hand, if the air is absorbing heat and, thereby, expanding, the rate of discharge is increased. Of course, the discharge of the liquid from the reservoir may be interrupted at any time by closing the stop-cock or valve 16 in the discharge pipe.

As before set forth, the rate of discharge may be controlled or regulated in either of two ways, or a combination of the two. First, if the opening in air inlet pipe 23 is constant, the item $H^2$ may be increased or decreased to secure the desired flow. On the other hand, the item $H^2$ may be maintained constant and the size of the air orifice adjusted to secure the desired flow. In either instance, the variations of these factors should be gradual. It will be appreciated, of course, that the flow may be regulated by adjusting both item $H^2$ and the air inlet opening.

What I claim is:

1. In a liquid feed control device, the combination of a reservoir for the liquid, means for exhausting air from the reservoir, an inlet pipe through which fluid under pressure is admitted to the reservoir, a discharge pipe terminating below the interior terminal of the fluid inlet pipe, retaining means for liquid at the terminal of said discharge pipe to submerge said terminal, and means for varying the elevation of said retaining means to alter the extent of submergence of the discharge pipe.

2. In a liquid feed control device, the combination of a reservoir for the liquid, means for exhausting air from the reservoir, an inlet pipe through which fluid under pressure is admitted to the reservoir, a discharge pipe terminating below the interior terminal of the fluid inlet pipe, retaining means for liquid at the terminal of said discharge pipe to submerge said terminal, the extent of submergence determining the effective point of discharge of the discharge pipe, and means for varying the extent of submergence of said pipe.

3. In a liquid feed control device, the combination of a sealed reservoir for the liquid, a discharge pipe adjacent the lower end of said reservoir, an air inlet pipe extending into said reservoir terminating at a point below the normal liquid level but above the discharge point of the discharge pipe, means communicating with the upper interior of the reservoir for exhausting air therefrom during admission of liquid to the reservoir whereby a vacuum space is provided in the reservoir above the liquid to effect a balance between atmospheric pressure and the pressure in said space plus the pressure of the column of liquid in the reservoir measured from the surface of the liquid to said discharge point, and means for controlling the admission of air through said inlet pipe to relieve said vacuum and disturb said balance of pressure by increasing the pressure within the reservoir.

GEORGE W. MOORE.